United States Patent [19]

Ishigaki et al.

[11] Patent Number: 5,075,342

[45] Date of Patent: Dec. 24, 1991

[54] PROCESS FOR PRODUCING AN ION EXCHANGE MEMBRANE BY GRAFTING NON ION-SELECTIVE MONOMERS ONTO A ION EXCHANGE

[75] Inventors: Isao Ishigaki, Maebashi; Takanobu Sugo, Gunma; Jiro Okamoto, Takasaki, all of Japan

[73] Assignee: Japan Atomic Energy Research Institute, Tokyo, Japan

[21] Appl. No.: 609,035

[22] Filed: Nov. 7, 1990

Related U.S. Application Data

[60] Continuation of Ser. No. 867,582, May 27, 1986, abandoned, which is a continuation of Ser. No. 647,667, Sep. 6, 1984, abandoned, which is a division of Ser. No. 551,884, Nov. 15, 1983, abandoned, which is a continuation-in-part of Ser. No. 290,302, Aug. 5, 1981, abandoned.

[30] Foreign Application Priority Data

Aug. 8, 1980 [JP] Japan ............................ 55-113201

[51] Int. Cl.$^5$ ........................... C08J 5/20; C25B 13/00
[52] U.S. Cl. .................................. 521/27; 521/30; 29/623.5; 429/206; 204/296
[58] Field of Search ................. 521/27, 30, 31; 204/252, 98, 296; 522/114, 120; 429/229

[56] References Cited

U.S. PATENT DOCUMENTS

| | | | |
|---|---|---|---|
| 3,970,534 | 7/1976 | Fujiwara et al. | 521/27 |
| 4,097,420 | 6/1978 | Mikes et al. | 526/210 |
| 4,122,133 | 10/1978 | Bernstein et al. | 522/149 |
| 4,132,682 | 1/1979 | Seita et al. | 521/27 |
| 4,137,137 | 1/1979 | Machi et al. | 521/27 |
| 4,139,684 | 2/1979 | Coupek | 521/27 |
| 4,196,065 | 4/1990 | Gaussens et al. | 522/114 |
| 4,230,549 | 10/1980 | D'Agostino et al. | 204/159.15 |
| 4,339,473 | 7/1982 | D'Agostino | 522/120 |
| 4,376,794 | 3/1983 | Machi et al. | 522/120 |
| 4,721,648 | 1/1988 | Kleine-Doepke | 522/120 |

*Primary Examiner*—Thurman K. Page
*Assistant Examiner*—Peter F. Kulkosky
*Attorney, Agent, or Firm*—Browdy and Neimark

[57] ABSTRACT

A separator membrane for use in secondary alkali batteries having a non-ion selective hydrophilic group and ion exchange group said membrane having an electrical resistance which, when said membrane is heated in 12NaOH for 30 minutes at a temperature between about 20° and 100° C., varies from the initial value for 20° C. by an amount between 10% and about 24% and the process thereof are herein disclosed.

2 Claims, No Drawings

PROCESS FOR PRODUCING AN ION EXCHANGE MEMBRANE BY GRAFTING NON ION-SELECTIVE MONOMERS ONTO A ION EXCHANGE

CROSS REFERENCE TO OTHER APPLICATION

This application is a continuation of co-pending application Ser. No. 867,582, filed May 27, 1986, now abandoned, itself a continuation of application Ser. No. 647,667, filed Sept. 6, 1984, now abandoned, itself a division of application Ser. No. 551,884, filed Nov. 15, 1983, now abandoned, itself a continuation-in-part application of Ser. No. 290,302, filed Aug. 5, 1981, now abandoned.

BACKGROUND OF THE INVENTION

1. Field of the Invention

The present invention relates to a separator membrane for use in secondary alkali batteries. More particularly, the present invention relates to a separator membrane for use in secondary alkali batteries that is dimensionally stable and which retains a constant electrical resistance in a hot and concentrated aqueous alkali solution.

2. Description of the Prior Art

Secondary alkali batteries (e.g. Ni—Zn and Ni—Cd) use a concentrated KOH or NaOH aqueous solution as the electrolyte and require a separator that has to meet essentially the same requirements as a separator used in silver oxide primary batteries. In secondary alkali batteries, the temperature of the electrolyte may exceed 100° C. if the battery is repeatedly charged and discharged at high rate within a short period. If, under this hot environment, the electrical resistance of the separator is increased or its dimensions are changed, the batteries performance is reduced.

Therefore, the present inventors have made various efforts to produce a separator membrane which experiences minimum swelling in a hot and concentrated alkaline aqueous solution.

Ion exchange membranes are important as a separator indispensable to electrolysis and electrodialysis. Most of the conventional ion exchange membranes are composed of a styrene-divinyl benzene or a styrene-butadiene copolymer having a sulfone group or a quaternary vinyl pyridinum salt introduced therein, but because of their inadequate mechanical strength and chemical resistance, they find only limited utility.

With recent advances in technology for manufacture and application of ion exchange membranes, various ion exchange membranes have been developed and their use is increasingly expanded. An ion exchange membrane made of a fluorine-containing polymer using a sulfone group or carboxyl group as an exchange has been found to be useful as a separator for brine electrolysis in the manufacture of caustic soda or as a high-molecular electrolyte for water electrolysis, and it has also been found that an ion exchange membrane prepared by grafting acrylic acid or methacrylic acid onto a polyethylene film has good properties for use as a separator in an alkali batteries using aqueous KOH or NNaOH as an electrolyte. But one great problem of these ion exchange membrane is that their electrical resistance is increased with increasing temperature in a relatively high concentration of aqueous KOH or NaOH. To reduce the theoretical decomposing voltage and also to lower the overpotential and ohmic loss due to solution resistance, brine electrolysis or water electrolysis is desirably performed at elevated temperatures. The temperature of secondary batteries is rapidly increased during high rate discharge and charge cycles, so they are required to have high heat resistance. So the separator for use in these applications is desirably such that its electrical resistance is not increased at elevated temperatures.

SUMMARY OF THE INVENTION

We have reviewed many cases where the electrical resistance of separator membrane is increased with temperature in a highly concentrated aqueous alkali solution, and have found that the higher the exchange capacity of the membrane, the greater the increase in electrical resistance, and that the increase in electrical resistance is due to a drop in the percentage swelling of the membrane that occurs with increasing concentrations and temperatures of the aqueous alkali. Based on this finding, we have made various studies to develop an ion exchange membrane whose percent swelling is not greatly influenced by the temperature or the concentration of the solute and accomplished an invention which is described herein.

Therefore, the primary object of this invention is to provide a separator membrane whose electrical resistance depends little on the temperature of a highly concentrated aqueous alkaline solution. This object is achieved by introducing both a non-ion selective hydrophilic group and an ion exchange group in the substrate of the monomer.

Another object of this invention is to provide a separator membrane for use in secondary alkali batteries having a non-ion selective hydrophilic group and ion exchange group, said membrane having an electrical resistance which, when said membrane is heated in 12N NaOH for 30 minutes at a temperature between about 20° and 100° C., varies from the initial value for 20° C. by an amount between 10% and about 24%.

A further object of this invention is to provide a process for producing a separator membrane for use in secondary alkali batteries having a non-ion selective hydrophilic group and an ion exchange group, which process comprises grafting to an ion exchange membrane a monomer having a non-ion selective hydrophilic group and/or a monomer having a functional group capable of being converted to a non-ion selective hydrophilic group by hydrolysis or other suitable treatment, and then optionally performing hydrolysis or other suitable treatment to thereby introduce a non-ion selective hydrophilic group into the ion exchange membrane, whereby the resultant membrane has an electrical resistance which, when said membrane is heated in 12N NaOH for 30 minutes at a temperature between about 20° and 100° C., varies from the initial value for 20° C. by an amount between 10% and about 24%.

A still further object of this invention is to provide a process for producing a separator membrane for use in secondary alkali batteries having a non-ion selective hydrophilic group and an ion exchange group, wherein a monomer having an ion exchange group and/or a monomer having a functional group capable of being converted to an ion exchange group by hydrolysis or other suitable treatment, as well as a monomer having a non-ion selective hydrophilic group and/or a monomer having a functional group capable of being converted to a non-ion selective hydrophilic group by hydrolysis or other suitable treatment are co-grafted or individually grafted to a polymer film, and optionally the polymer film is hydrolyzed or subjected to other suitable treatment at a suitable timing to thereby introduce an ion exchange group and a non-ion selective hydrophilic group into the polymer film, whereby the resultant membrane has an electrical resistance which, when said membrane is heated in 12N NaOH for 30 minutes at a temperature between about 20° and 100° C., varies from the initial value for 20° C. by an amount between 10% and about 24%.

DETAILED DESCRIPTION OF THE PREFERRED EMBODIMENT

The substrate in which a non-ion selective hydrophilic group or an ion exchange group is introduced is made of various hydrocarbon- or halogen-containing polymer films (the term "film" as used herein includes "sheets") or ion exchange membrane prepared by the copolymerization method or blending method. The ion exchange membrane contemplated by this invention can be produced by grafting a monomer containing as ion exchange group to the hydrocarbon or halogen-containing polymer film, or by grafting a monomer containing a non-ion selective hydrophilic group to the ion exchange membrane of the latter type.

In the practice of this invention, the following methods can be used to produce an ion exchange membrane wherein both an ion exchange group and a non-ion selective hydrophilic group are incorporated in the substrate:

(1) A monomer containing an ion exchange group (hereunder referred to as "monomer A") and/or a monomer containing a functional group capable of being converted to an ion exchange group by treatment such as hydrolysis (hereunder referred to as "monomer B") and a monomer containing a non-ion selective hydrophilic group (hereunder referred to as "monomer C") and/or a monomer having a functional group capable of being converted to a non-ion selective hydrophilic group by treatment such as hydrolysis (hereunder referred to as "monomer D") are co-grafted to a polymer film;

(2) monomer A and/or monomer B are first grafted to a polymer film, and then monomer C and/or monomer D are grafted to the film;

(3) monomer C and/or monomer D are first grafted to a polymer film, and then monomer A and/or monomer B are grafted to the film; and (4) monomer C and/or monomer D are grafted to an ion exchange membrane.

Hydrolysis and other treatments to convert the functional group in monomer B to an ion exchange group or to convert the functional group in monomer D to a non-ion selective hydrophilic group may be performed in the last step of each method, or after the first grafting is effected in methods (2) and (3). The timing of this treatment is properly selected depending upon the physical properties of the monomer and solvent used, as well as the ease of the intended grafting.

The substrate for the ion exchange membrane of this invention is made of a film of hydrocarbon- or halogen-containing polymers to which a monomer can be grafted, such as polyethylene polypropylene, polybutadiene, polytetrafluoroethylene, poly(tetrafluoroethylene-ethylene), poly(tetrafluoroethylenehexafluoropropylene), poly(tetrafluoroethylene-perfluorovinylether), polyvinylidene fluoride, polyvinyl fluoride, polyethylene terephthalate, polyvinyl chloride, polyamide and polyester. Alternatively, the substrate may be made of an ion exchange membrane to which a monomer can be grafted and which is prepared by treating the above listed polymer films by the graft polymerization, copolymerization or blending method.

Examples of monomer A are vinyl compounds containing a sulfone group or carboxyl group such as styrenesulfonic acid, vinylsulfonic acid, trifluorovinylsulfonic acid, 2-acrylamido-2-methylpropanesulfonic acid, acrylic acid, trifluoroacrylic acid, methacrylic acid, or sodium and potassium salts thereof. Examples of monomer B are vinyl compounds having a functional group capable of being converted to an ion exchange group such as sulfone group or carboxyl group by such treatment as hydrolysis, for instance, trifluorovinylsulfonyl fluoride, methyl trifluoro-acrylate, methyl or ethyl esters of acrylic acid or methacrylic acid, acrylamide and acrylonitrile. Examples of monomer C are hydrophilic vinyl compounds containing a hydroxyl group, glycol, etc. such as 2-hydroxyethyl methacrylate, 2-hydroxyethyl acrylate, alkyl alcohol, polyethylene glycol acrylate, polyethylene glycol methacrylate, polyethylene glycol diacrylate, polyethylene glycol dimethacrylate, and N-vinylpyrrolidone. Examples of monomer D are vinyl monomers having a functional group that is converted to a non-ion selective hydrophilic group by such treatment as hydrolysis after grafting, for instance, vinyl acetate, allyl acetate and allyl formate. The proportion of monomer A and/or monomer B to monomer C and/or monomer D to be introduced into the polymer, namely, the ratio of the concentration of ion-exchange groups (exchange capacity) to that of non-ion selective hydrophilic group in the separator membrane, is determined properly by the object of the use of the membrane. The electrical resistance of the separator membrane primarily depends on the exchange capacity and percent swelling, and it decreases as these factors increase. So, even if the exchange capacity is small, an ion exchange membrane with ion electrical resistance can be produced by increasing the concentration of hydrophilic groups. But if the ion exchange membrane for use as a separator for electrolysis or electrodialysis contains an excessively great amount of non-ion selective hydrophilic group, the ion selectivity is decreased and hence the current efficiency is decreased. If the ion exchange membrane is used as a separator in batteries which does not require very high ion permselectivity, the content of the non-ion selective hydrophilic group is preferably increased to prevent the electrical resistance of the separator from being increased with increasing temperatures in a highly concentrated aqueous alkaline solution In alkaline secondary cells, OH$^-$ is spent at the negative electrode during discharge and at the positive electrode during charging, so in order to achieve high rate discharge and charge, OH$^-$ must be supplied through the separator. So, the separator is preferably made of a membrane having a high concentration of non-ion selective hydrophilic groups rather than an ion selective exchange group such as sulfone group or carboxyl group.

Grafting of the monomers listed above can be performed by either the radiation grafting method using ionizing radiation or the catalytic method using a radical initiator. The object of this invention can be achieved more readily by the former method. The radiation grafting method can be accomplished by either pre-irradiation or simultaneous irradiation. According to the pre-irradiation, a polymer film or ion exchange membrane is irradiated with ionizing radiation, and then it is immersed in or contacted by a monomer solution for grafting of the monomer. According to the simultaneous irradiation, a polymer film or ion exchange membrane within or in contact with a monomer solution is irradiated with ionizing radiation for grafting the monomer. Either method can be used to achieve the object of this invention.

When monomer B and/or monomer D is used in this invention, the functional group in monomer B must be converted to an ion exchange group and that in monomer D to non-ion selective hydrophilic group by a suitable treatment such as hydrolysis. The proper method of treatment should be determined depending on the properties of the polymer film or ion exchange membrane used as the substrate, and on the graft polymer (i.e. homopolymer or copolymer of monomer B or D).

This invention is now described in greater detail by reference to the following examples to which the scope of this invention is by no means limited.

EXAMPLE 1

A commercial ion exchange membrane, Nafion 120 (available from du Pont) was irradiated with 5 Mrad of electron beams from a resonant transformer (2 MV. 1 mA) in a nitrogen atmosphere. The Nafion 120 was transferred to a reactor which was evacuated to $10^{-4}$ mmHg and fed with a solution of N-vinylpyrrolidone in benzene (40 wt % conc.) that had been bubbled with nitrogen gas to reduce the concentration of dissolved oxygen to less than 1 ppm. The Nafion 120 thus immersed in N-vinylpyrrolidone (WAKO PURE CHEMICAL INDUSTRIES CO., LTD.) was left to stand for 5 hours at room temperature to graft the monomer to the Nafion 120. To remove the unreacted monomer and homopolymer (non-graft polymer) by extraction, the resulting membrane was taken out of the reactor and washed, in sequence, with benzene (60° C.) for 5 hours, acetone at room temperature for 30 minutes and boiling distilled water for 5 hours, and dried. The resulting graft membrane had a graft ratio of 43% as determined by the weight method.

The graft membrane (NVP-g-Nafion 120) and Nafion 120 as commercially available were heated in 12 N NaOH at a temperature between 20° and 100° C. for 30 minutes, and the electrical resistance of each membrane was measured using: an a.c. source (1,000 Hz). The results are shown in Table 1.

TABLE 1

| Membrane | Electrical Resistance (in ohm-cm²) | | | | |
|---|---|---|---|---|---|
| | Heating temperature (°C.) | | | | |
| | 20 | 40 | 60 | 80 | 100 |
| NVP-g-Nafion 120 | 19.4 | 20.2 | 25.4 | 22.0 | 23.2 |
| Nafion 120 | 25.1 | 30.2 | 44.4 | 63.4 | 96.3 |

The percentage change of the electrical resistance of the ion exchange membrane with the rise in temperature from 20° C. to 100° C., calculated from Table 1 above, is 19.5/8%.

EXAMPLE 2

Commercially available Nafion 120 was immersed in a solution of vinyl acetate (WAKO PURE CHEMICAL INDUSTRIES CO., LTD.) in acetone (35% conc) and by repeating freeze-degassing three ($10^{-4}$ mmHg), the concentration of dissolved oxygen was reduced less than 0.5 ppm. The nafion was irradiated with γ-rays from Co-60 at a dose rate of $1 \times 10^5$ rad/hr at room temperature for 3 hour to graft vinyl acetate to the polymer. The resulting graft membrane was washed thoroughly with boiling acetone and dried. The membrane had a graft ratio of 25%. THE membrane was then hydrolyzed with a mixture of 60 parts of methanol, 38 parts of water and 2 parts of NaOH at 80° C. for 30 minutes. The hydrolyzed membrane was heated in 12N NaOH for 30 minutes as Example 1, and its electrical resistance was measured at room temperature. The results are set forth in Table 2.

TABLE 2

| (in ohm-cm²) | | | | | |
|---|---|---|---|---|---|
| Heating temperature (°C.) | 20 | 40 | 60 | 80 | 100 |
| Electrical resistance | 18.6 | 18.5 | 19.3 | 22.5 | 21.3 |

The percentage change of the electrical resistance of the ion exchange membrane with the rise in temperature from 20° C. to 100° C., calculated from Table 2 above, is 14.5%.

EXAMPLE 3

A high-density polyethylene (ASAHI CHEMICAL "F 400") membrane 50 μm thick was irradiated with 30 Mrad of electron beams as in Example 1, transferred to a monomer mixture (35% sodium trifluoroacrylate and 65% alkyl alcohol) prepared in accordance with U.S. Pat. No. 2,795,601, J. L. Rendall et al. that had been freeze-degassed to reduce the content of dissolved oxygen to less than 0.5 ppm, and immersed there at 35° C. for 5 hours for grafting the monomers to the polyethylene. The resulting membrane was then washed by immersing it in a mixture of 70 parts of methanol and 30 parts of water at 80° C. for 10 hours, and dried. The membrane had a graft ratio of 45% as determined by the weight method.

Three samples were taken out of the so obtained membrane and they were immersed in 12 N NaOH at room temperature (25° C.), 60° C. and 100° C. for 30 minutes, and their electrical resistance (specific resistance) was measured at room temperature in 12 N NaOH. The respective values were 35, 38 and 37 ohm-cm.

EXAMPLE 4

A polytetrafluoroethylene (NITO DENKO "NITOFLON No. 900") membrane 80 μm thick was immersed in a 50% aqueous solution of acrylic acid (KISHIDA CHEMICAL) and bubbled with nitrogen to reduce the content of dissolved oxygen to less than 0.5 ppm, and irradiated with γ-rays from Co-60 at a dose rate of $1 \times 10^5$ rad/hr at room temperature for 5 hours in a nitrogen atmosphere. The irradiated membrane was washed with water and dried. The resulting graft membrane had a graft ratio of 34%. Part of the membrane was cut out and immersed in a 20% aqueous solution of polyethylene glycol dimethacrylate (SHIN NAKAMURA CHEMICAL CO., LTD. "A-9G")

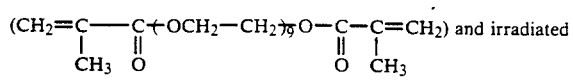 and irradiated with γ-rays from Co-60 as in above. The resulting membrane had a graft ratio of 12%.

The electrical resistance (specific resistance) of the two membranes (Membrane I: only acrylic acid was grafted, Membrane II: acrylic acid and polyethylene glycol dimethacrylate were grafted) was measured as in Example 3.

TABLE 3

| Electrical Resistance (Specific Resistance) (in ohm-cm) | | | |
|---|---|---|---|
| Heating temperature (°C.) | 25 | 60 | 100 |
| Membrane I | 45 | 70 | 110 |
| Membrane II | 39 | 42 | 45 |

The percentage change of the electrical resistance of the ion exchange membrane with the rise in temperature from 25° C. to 100° C., calculated from Table 3 above, is 15.3/8%.

EXAMPLE 5

A low-density polyethylene (ASAHI DOW "F-2135") film 50 μm thick was irradiated with 10 Mrad of electron beams and immersed in a 50% aqueous solution of acrylic acid (KISHIDA CHEMICAL) ($O_2$ conc 0.3 ppm) for 3 hours to provide a membrane having a graft ratio of 65% (Membrane I). Part of the membrane was irradiated with γ-rays from Co-60 at it was immersed in 20% vinyl acetate in acetone. The graft membrane was washed with acetone at 50° C. for 10 hours, and dried. The resulting membrane had a graft ratio of 22%.

The electrical resistance (specific resistance) of the two membranes was measured as in Example 3 except that 40% KOH was used as an electrolyte. The results are shown in Table 4.

TABLE 4

| Electrical Resistance (Specific Resistance) (in ohm-cm) | | | |
|---|---|---|---|
| Heating temperature (°C.) | 25 | 60 | 110 |
| Membrane I | 18 | 27 | 53 |
| Membrane II | 14 | 13 | 16 |

The transport member of Membranes I and II was measured with 0.5N KCl and 0.1N KCl, and the respective values were 0.79 and 0.63.

EXAMPLE 6

A polytetrafluoroethylene (NITO DENKO "NITOFLON No. 900") film 50 μm thick was irradiated with 3 Mrad of electron beams in a nitrogen atmosphere, and immersed in a solution of freeze-degassed vinyl acetate (MITSUBISHI RAYON) in acetone (25%) at room temperature for 2 hours to graft the vinyl acetate to the polymer. The resulting membrane had a graft ratio of 18%. The membrane was then hydrolyzed in Example 2. The hydrolyzed membrane was irradiated with 3 Mrad of electron beams and immersed in an aqueous solution of methacrylic acid (conc. 25%) at room temperature for 5 hours. The solution had been degassed to reduce the concentration of dissolved oxygen to less than 0.5 ppm. The resulting membrane had a graft ratio of 53%. The electrical resistance of the graft membrane was measured as in Example 3. The results are shown in Table 5.

TABLE 5

| (in ohm-cm) | | | |
|---|---|---|---|
| Heating temperature (°C.) | 25 | 60 | 100 |
| Electrical resistance (specific resistance) | 20 | 22 | 22 |

The percentage change of the electrical resistance of the ion exchange membrane with the rise in temperature from 25° C. to 100° C., calculated from Table 5 above, is 10.0%.

EXAMPLE 7

A polytetrafluoroethylene (NITO DENKO "NITOFLON No. 900") film 80 μm thick was immersed in a mixture of 40 parts of methyl trifluoroacrylate and 60 parts of allyl alcohol which was bubbled with nitrogen to reduce the concentration of dissolved oxygen to less than 0.5 ppm, and then the film was irradiated with γ-rays from Co-60 at a dose rate of $1 \times 10$ rad/hr for 5 hours. To remove any unreacted monomer and homopolymer, the film was refluxed in boiling dimethyl sulfoxide for 10 hours to provide a membrane having a graft ratio of 48%. The graft membrane was hydrolyzed as in Example 2 and the electrical resistance (specific resistance) of the membrane was measured as in Example 3. The results are shown in Table 6.

TABLE 6

| (in ohm-cm) | | | |
|---|---|---|---|
| Heating temperature (°C.) | 25 | 60 | 100 |
| Electrical resistance (specific resistance) | 35 | 33 | 33 |

EXAMPLE 8

A high-density polyethylene (ASAHI CHEMICAL "F400") film 25 μm thick was irradiated with 20 Mrad of electron beam and immersed in a 50% aqueous solution of freeze-degassed acrylamide at room temperature for 5 hours to provide a membrane having a graft ratio of 63%. The membrane was then hydrolyzed with a 2.5% aqueous solution of KOH at 95° C. for 30 minutes. The resulting membrane was designated as Membrane I. Part of Membrane I was cut out and irradiated with γ-rays from Co-60 at a dose rate of $1 \times 10^5$ rad/hr at room temperature for 3 hours as it was immersed in a solution of N-vinylpyrrolidone in benzene (conc. 30%). After refluxing in boiling benzene, the irradiated membrane was dried to provide a graft membrane having a graft ratio of 18% (Membrane II). The electrical resistance (specific resistance) and transport number of the two membranes were measured as in Example 5. The results are shown in Table 7.

TABLE 7

| Membrane | Electrical Resistance (specific resistance) (ohm-cm) | | | Transport number |
|---|---|---|---|---|
| | Temperature (°C.) | | | |
| | 25 | 60 | 110 | |
| I (acrylamide grafted) | 15 | 28 | 45 | 0.89 |
| II (acrylamide + N-vinylpyrrolidone grafted) | 13 | 13 | 16 | 0.75 |

The percentage change of the electrical resistance of the ion exchange membrane with the rise in temperature from 25° C. to 110° C., calculated from Table 7 above, is 23.07%.

EXAMPLE 9

A poly(tetrafluoroethylene-hexafluoropropylene) (du Pont "FED Teflon") film 80 μm thick was irradiated with 5 Mrad of electron beams at room temperature in a nitrogen atmosphere, and immersed in a mixture of 40 parts of methyl trifluoroacrylate, 10 parts of allyl acetate and 50 parts of tetrahydrofuran at room temperature for 24 hours. The mixture had been bubbled with nitrogen to reduce the concentration of dissolved oxygen to less than 0.5 ppm. After the grafting, the film was taken out of the mixture and washed with a boiling mixed solvent of 50 parts of tetrahydrofuran and 50 parts of acetone for a whole day and night, and dried. The resulting membrane had a graft ratio of 47%. The membrane was then heated in a mixture of 50 parts of dimethyl sulfoxide, 47.5 parts of water and 2.5 parts of NaOH at 80° C. for one hour, and the electrical resistance (specific resistance) of the membrane was measured as in Example 3. The results are shown in Table 8.

TABLE 8

| (in ohm-cm) | | | |
|---|---|---|---|
| Heating temperature (°C.) | 25 | 60 | 100 |
| Electrical resistance (specific resistance) | 45 | 42 | 40 |

EXAMPLE 10

A high-density polyethylene (ASAHI CHEMICAL "F400") film 75 μm thick was immersed in a mixture of 30 parts of vinyl acetate (MITSUBISHI RAYON), 50 parts of methanol and 20 parts of water, and bubbled with nitrogen to reduce the concentration of dissolved oxygen to less than 0.5 ppm. Thereafter, the film was irradiated with γ-rays from Co-60 at a dose rate of $1 \times 10^5$ rad/hr for 5 hours. The resulting membrane was washed with boiling acetone and dried. The membrane had a graft ratio of 43.3%. The membrane was subsequently irradiated with 10 Mrad of electron beams and immersed in a nitrogen-bubbled mixture of 50% acrylonitrile and 50% acetone at 40° C. for 2 hours to graft the acrylonitrile to the membrane. The membrane was washed and dried as above to provide a graft ratio of 67.5%. The membrane to which vinyl acetate and acrylonitrile were thus grafted was heated in a mixture of 60 parts of methanol, 37.5 parts of water and 2.5 parts of NaOH at 80° C. for 60 minutes. The electrical resistance (specific resistance) of the membrane was measured as in Example 3, and the results are shown in Table 9.

TABLE 9

| (in ohm-cm) | | | |
|---|---|---|---|
| Heating temperature (°C.) | 25 | 60 | 100 |
| Electrical resistance (specific resistance) | 23 | 22 | 20 |

EXAMPLE 11

A polytetrafluoroethylene (NITO DENKO "NITFLON No. 900") film 50 μm thick was immersed in a mixture of 30 parts of trifluorovinylsulfonyl fluoride, 30 parts of allyl acetate and 40 parts of Freon R-113 prepared by Journal Chemical Society, C-1966, p.1171, R. E. Banks, and after bubbling with nitrogen, the film was irradiated with γ-rays from Co-60 at a dose rate of $1 \times 10^5$ rad/hr for 10 hours. Then, the irradiated film was washed with a boiling mixture of 50 parts of Freon R-113 and 50 parts of acetone, and dried. The resulting membrane had a graft ratio of 53.2%. The membrane was hydrolyzed as in Example 2, and the electrical resistance (specific resistance) of the membrane was measured as in Example 1. The results are shown in Table 10.

TABLE 10

| (in ohm-cm) | | | |
|---|---|---|---|
| Heating temperature (°C.) | 25 | 60 | 100 |
| Electrical resistance (specific resistance) | 125 | 127 | 119 |

What is claimed is:

1. A process for producing a separator membrane for use in secondary alkali batteries having a non-ion selective hydrophilic group and an ion exchange group comprising grafting to the ion exchange membrane a monomer selected from the group consisting of N-vinylpyrrolidone and vinyl acetate onto a Nafion substrate, whereby the resultant membrane has an electrical resistance which, when said membrane is heated in 12N NaOH for 30 minutes at a temperature between 20° C. and 100° C., varies from the initial value for 20° C. by an amount between 10% and 24% and wherein the swelling percent of the membrane is below 20% at a temperature of less than 10° C.

2. A process for producing a secondary alkali battery having a separator membrane, comprising the step of contacting the resultant membrane of claim 7 with an alkali solution of a secondary alkali battery so as to provide a secondary alkali battery having said resultant membrane as a separator membrane.

* * * * *

UNITED STATES PATENT AND TRADEMARK OFFICE
CERTIFICATE OF CORRECTION

PATENT NO. : 5,075,342
DATED : December 24, 1991
INVENTOR(S) : ISHIGAKI et al.

It is certified that error appears in the above-identified patent and that said Letters Patent is hereby corrected as shown below:

TITLE PAGE:

[60]    Delete
"Continuation of Ser. No. 867,582, May 27, 1986, abandoned, which is a continuation of Ser. No. 647,667, Sep. 6, 1984, abandoned, which is a division of Ser. No. 551,884, Nov. 15, 1983, abandoned, which is a continuation-in-part of Ser. No. 290,302, Aug. 5, 1981, abandoned."

Insert therefor
-- Continuation of Ser. No. 077,014, July 23, 1987, abandoned, which is a continuation of Ser. No. 867,582, May 27, 1986, abandoned, which is a continuation of Ser. No. 647,667, Sep. 6, 1984, abandoned, which is a division of Ser. No. 551,884, Nov. 15, 1983, abandoned, which is a continuation-in-part of Ser. No. 290,302, Aug. 5, 1981, abandoned. --

Signed and Sealed this

Twenty-third Day of November, 1993

*Attest:*

BRUCE LEHMAN

*Attesting Officer*    *Commissioner of Patents and Trademarks*